United States Patent
Bobroff et al.

(10) Patent No.: US 9,459,894 B2
(45) Date of Patent: Oct. 4, 2016

(54) ACTIVE CONTROL OF MEMORY FOR JAVA VIRTUAL MACHINES AND OTHER APPLICATION RUNTIME ENVIRONMENTS

(71) Applicant: International Business Machines Corporation, Armonk, NY (US)

(72) Inventors: Norman Bobroff, Katonah, NY (US); Liana Liyow Fong, Irvington, NY (US); Peter Hans Westernick, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 9 days.

(21) Appl. No.: 14/307,118

(22) Filed: Jun. 17, 2014

(65) Prior Publication Data
US 2015/0363133 A1  Dec. 17, 2015

(51) Int. Cl.
| G06F 3/06 | (2006.01) |
| G06F 9/445 | (2006.01) |
| G06F 9/455 | (2006.01) |
| G06F 12/00 | (2006.01) |

(52) U.S. Cl.
CPC ....... G06F 9/45529 (2013.01); G06F 9/45504 (2013.01); G06F 9/45558 (2013.01); G06F 12/00 (2013.01); G06F 2009/45583 (2013.01)

(58) Field of Classification Search
CPC ............. G06F 9/5077; G06F 9/45558; G06F 11/3442
USPC ........................................................ 717/148
See application file for complete search history.

(56) References Cited

U.S. PATENT DOCUMENTS

| 5,880,902 | A | * | 3/1999 | Yu | .......... | G11B 5/5534 |
| | | | | | | 360/77.04 |
| 7,434,206 | B2 | * | 10/2008 | Seidman | ............... | G06F 11/073 |
| | | | | | | 707/999.2 |
| 7,634,590 | B2 | * | 12/2009 | Addleman | .......... | H04L 12/2602 |
| | | | | | | 707/999.101 |
| 9,063,668 | B1 | * | 6/2015 | Jung | ..................... | G06F 3/0658 |
| 2006/0230087 | A1 | * | 10/2006 | Andreasson | ........ | G06F 12/0253 |
| 2010/0169536 | A1 | * | 7/2010 | Shedel | ................ | G06F 9/45558 |
| | | | | | | 711/6 |
| 2011/0196968 | A1 | * | 8/2011 | Kobayashi | ............ | G06F 9/5077 |
| | | | | | | 709/226 |

(Continued)

OTHER PUBLICATIONS

"Calculus: the slope of a curve";retreived from "http://www.math.utah.edu/lectures/math1210/7PostNotes.pdf";"Jan. 15, 2013"; "6 pages".*

(Continued)

Primary Examiner — Wei Zhen
Assistant Examiner — Brahim Bourzik
(74) Attorney, Agent, or Firm — Kevin Jordan, Esq.; McGinn IP Law Group, PLLC

(57) ABSTRACT

A method and structure for dynamic memory re-allocation for an application runtime environment (ARE) includes receiving, through an interface of an application runtime environment (ARE), a first set of internal operational metrics of the ARE executing at a current setting S1 on a processor of a computer. A first performance P1 of the ARE is determined at the current setting S1 using the received first set of internal operation metrics. The current setting S1 of the ARE is varied to a new setting S2. A second set of internal operational metrics of the ARE executing at the new setting S2 is received through the interface of the ARE. A second performance P2 of the ARE is determined at the new setting S2, using the received second set of internal operation metrics. A memory allocation for the ARE is re-allocated, based on the determined performances P1 and P2.

7 Claims, 12 Drawing Sheets

(56) References Cited

U.S. PATENT DOCUMENTS

| | | | | |
|---|---|---|---|---|
| 2011/0271276 | A1* | 11/2011 | Ashok | G06F 9/5077 718/1 |
| 2012/0137101 | A1* | 5/2012 | Arcese | G06F 9/5016 711/170 |
| 2013/0282994 | A1* | 10/2013 | Wires | G06F 3/0604 711/158 |
| 2015/0378762 | A1* | 12/2015 | Saladi | G06F 9/45558 718/1 |

OTHER PUBLICATIONS

Yang, T., Berger, E. D., Kaplan, S. F., and Moss, J. E. B. "CRAMM: Virtual Memory Support for Garbage-Collected Applications." 7th Symposium on Operating Systems Design and Implementation (2006), OSDI '06, USENIX Association, pp. 103-116.

Heo, J., Zhu, X., Padala, P., and Wang, A. "Memory Overbooking and Dynamic Control of Xen Virtual Machines in Consolidated Environments." In Integrated Network Management, 2009. IM' 09. IFIP/IEEE International Symposium on (2009), IEEE, pp. 630-637.

Hines, M. R., Gordon, A., Silva, M., da Silva, D., Ryu, K. D., and Ben-Yehuda, M. "Applications Know Best: Performance-Driven Memory Overcommit With Ginkgo." In Cloud Computing Technology and Science (CloudCom), 2011 IEEE Third International Conference on (2011), IEEE, pp. 130-137.

Salomie, T.-I., Alonso, G., Roscoe, T., and Elphinstone, K. "Application Level Ballooning for Efficient Server Consolidation." In Proceedings of the 8th ACM European Conference on Computer Systems (2013), EuroSys '13, AMC, pp. 337-350.

Zhao, W., and Wang, Z. "Dynamic Memory Balancing for Virtual Machines." In Proceedings of the 2009 ACM SIGPLAN/SIGOPS International Conference on Virtual Execution Environments (2009), VEE '09, ACM, pp. 21-30.

Waldspurger, C. A. "Memory Resource Management in VMware ESX Server." In Proceedings of the 5th Symposium on Operating Systems Design and Implementation. Dec. 2002, OSDI '02, ACM, pp. 181-194.

* cited by examiner

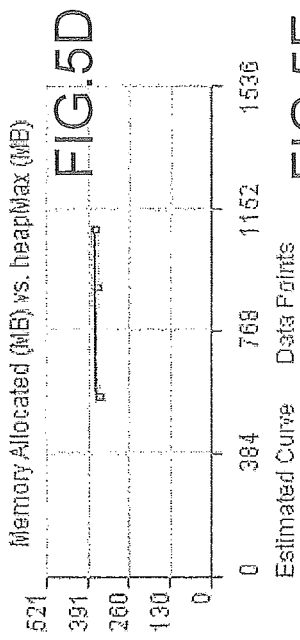
FIG.5A
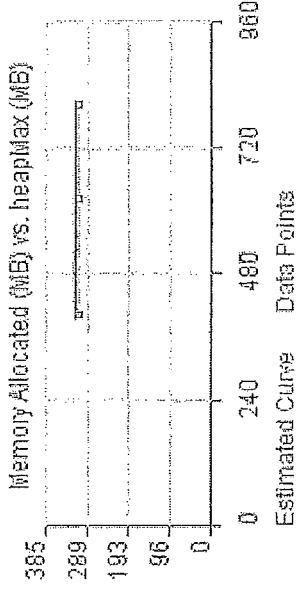
FIG.5B
FIG.5C
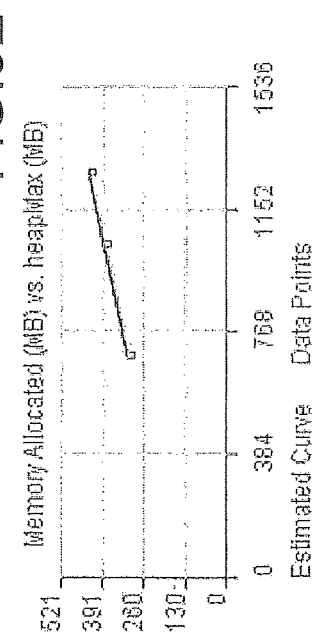
FIG.5D
FIG.5E
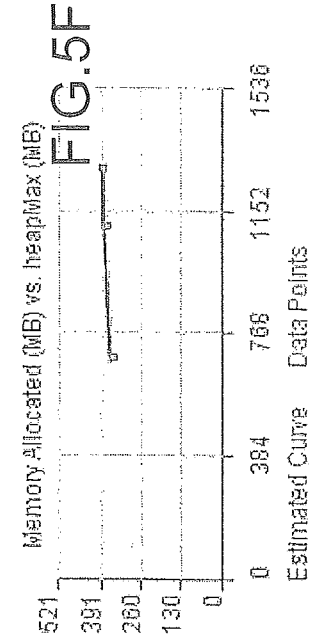
FIG.5F

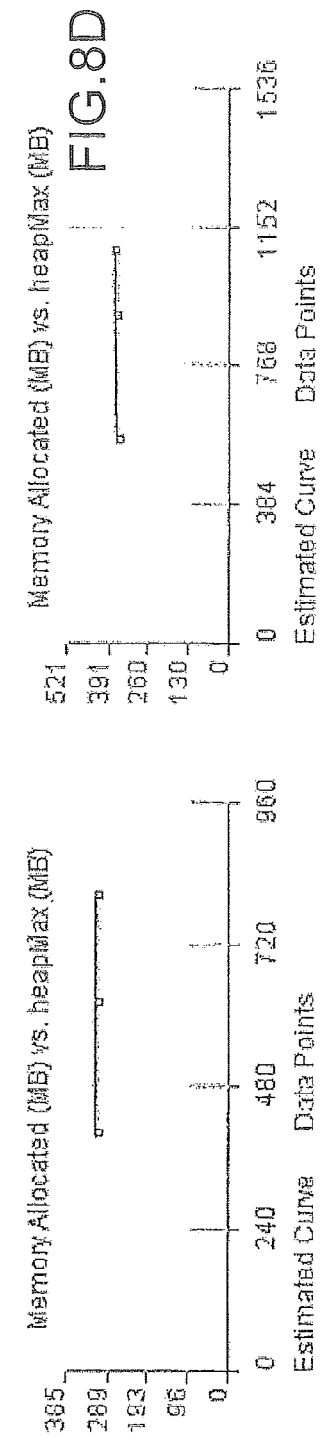
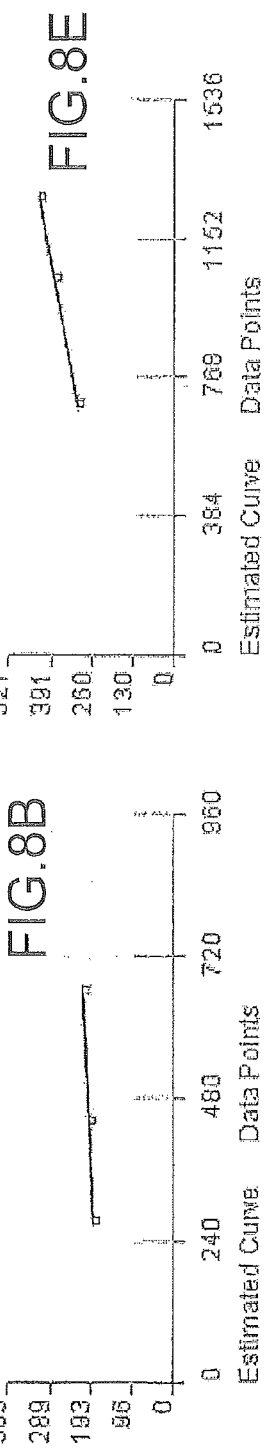
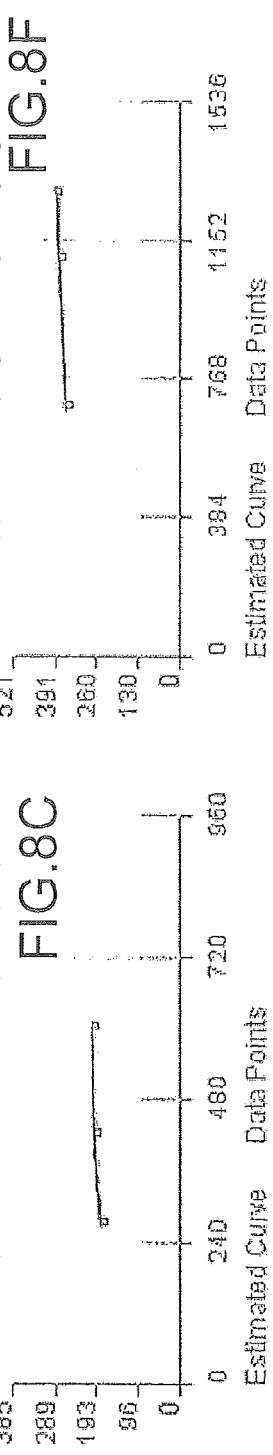

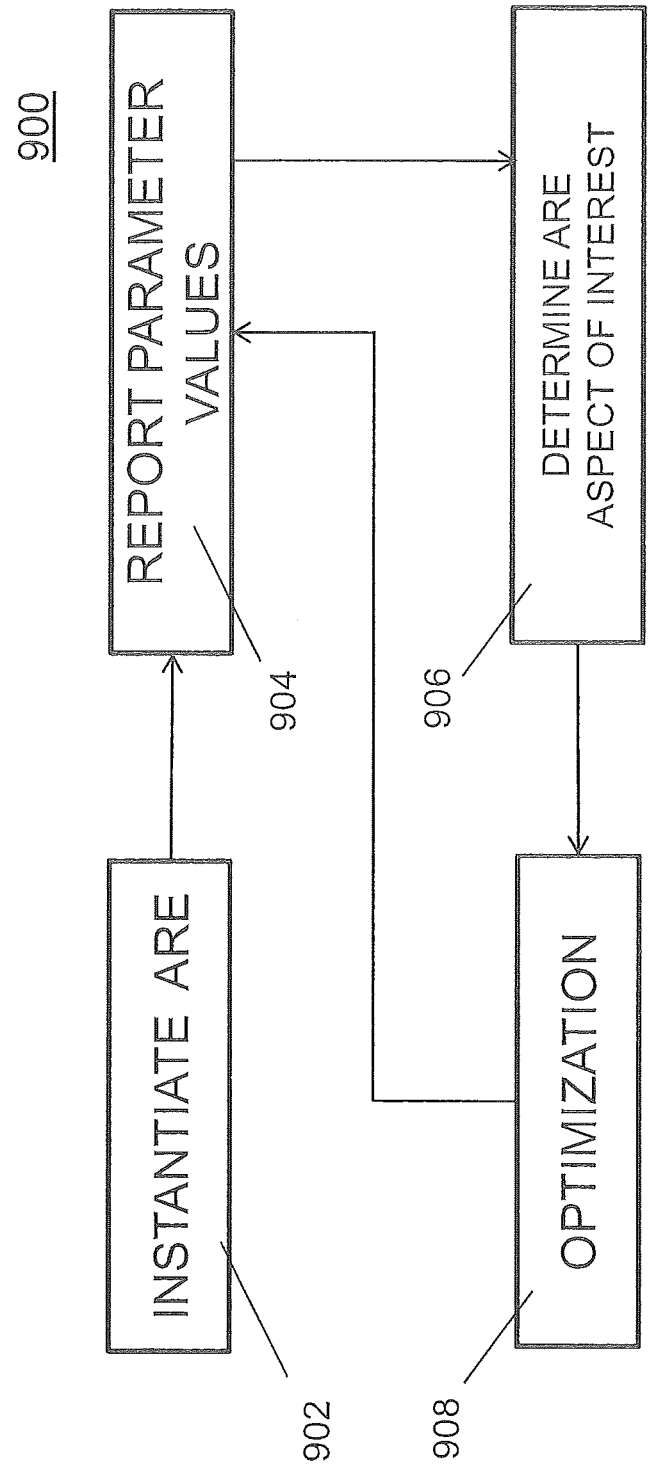

ACTIVE CONTROL OF MEMORY FOR JAVA VIRTUAL MACHINES AND OTHER APPLICATION RUNTIME ENVIRONMENTS

BACKGROUND OF THE INVENTION

1. Field of the Invention

The present invention generally relates to a memory management controller for applications such as virtual machines. More specifically, a technique selectively shifts physical memory size of each application runtime environment (ARE) to allow a performance of each currently-operating application runtime environment to be calculated using memory usage data reported from inside the application runtime environment, and memory is then reallocated so that all collocated application runtime environments have the same relative performance slope, thereby providing a mechanism that utilizes the total memory resource of the system as fairly allocated among all the currently-operating application runtime environments, based on current memory needs.

2. Description of the Related Art

As is well-known in the art, a virtual machine (VM) is a software implementation of a machine (e.g., a computer) that executes programs like a physical machine. A hypervisor or virtual machine monitor (VMM) creates and runs virtual machines, including memory allocation for the VM, and can be computer software, firmware, or hardware.

A computer on which a hypervisor is running one or more virtual machines is defined as a "host machine", and each virtual machine is called a "guest machine". The hypervisor presents the guest operating systems with a virtual operating platform and manages the execution of the guest operating systems. Multiple instances of a variety of operating systems may share the virtualized hardware resources As an initial matter, although the present invention is described in the environment of Java virtual machines (JVMs), there are many other virtual machine environments, so the methods described herein should not be considered as being limited to this specific environment. Any virtual machine or other application runtime environment that has internal metrics available through an interface, such as interface extensions, that can be sufficiently correlated with current performance of that virtual machine operation would potentially benefit from the method described by the present application. Some possible non-limiting examples of other runtimes are: V8 (Google's JavaScript engine), Ruby, Python, and C-sharp (Microsoft).

Perhaps even more significant, even though the exemplary embodiment described herein refers to JVMs, the method and structure of the present invention is not even constrained to constructs in a virtual environment. Rather, the present invention is considered as directed to any "application runtime environment" that has an interface that permits the reporting of internal memory parameter values of that environment to be reported externally. For purpose of the present invention, an "application runtime environment" is intended to refer to any process, as being executed on a computer, for which dynamic memory allocation is provided by a mechanism that is typically external to the environment itself, although the present invention can be expanded to be implemented in application runtime environments that internally provide memory allocation functions. Thus, a VM or a JVM would be specific instances of application runtime environments.

Thus, in addition to JVMs, the present invention, as implemented as the exemplary embodiment described herein, would also be directed to other types of virtual machines, as well as other types of applications running on a platform, or any other environment having memory allocations during runtime, as long as the environment has an interface that permits internal parameter values to be reported outside that environment. For example, certain containers such as Linux containers would be a non-limiting example of such application runtime environments that could potentially benefit from the techniques described in the present invention.

However, returning to the exemplary example involving JVMs, in recent years there has been widespread use of the Java virtual machine (JVM) as a server platform. Matching real memory and CPU resources to the time varying memory-processor demand footprint of applications is an important element in systems performance management, but there are issues associated with JVM memory management.

For example, even a single JVM configuration can have an issue in that the single JVM may take all the allowed memory (e.g., the heap size limit) but there is no performance benefit for such large physical memory consumption. Additionally, a single JVM may take memory from the OS but may not need it later when its workload changes. For configurations involving multiple collocated JVMs, one or more of the JVMs may take or reserve much more memory than is necessary.

One existing solution to manage JVM memory assumes that the JVM workload is instrumented to measure performance, but such performance instrumentation is typically not available and, even if available, the interpretation is domain specific and it is therefore difficult to devise a general solution.

Another disadvantage is that existing solutions fail to provide global optimization of memory resources. Even if an attempt is made so that each JVM is given enough memory to avoid a performance drop, severe shortage still results in swapping of memory. Conventional solutions are based on how much memory a JVM takes, but a JVM may not even benefit from additional memory.

Active sharing of processors between applications within and across virtual machines (VMs) in response to demand is a mature feature of the operating systems and hypervisors. Active sharing of memory (ASM) is analogously similar, in that ASM is a capability where physical memory pages move seamlessly between applications and across virtual machines to satisfy demand.

This technique improves system-wide memory utilization, or alternatively increases the application density or workload intensity hosted on a computer system. ASM is sometimes referred to as "logical memory over-commit", as it reduces the total amount of memory necessary in a system with time varying workloads from the sum of the maximum demand of each workload to the maximum of the sum of the workloads.

The ASM technique is, however, distinguished from paging, which requires saving and restoring state in order to reuse pages from processes or VMs. Exploiting ASM requires the ability to identify unused memory in applications and operating systems and to map or re-map those pages to collocated applications, or to move them to another VM on a common hypervisor. This page reassignment is widely available at the VM-hypervisor layer in the commercial space.

However, support at the application layer has been lagging as traditional application design and coding practice has not emphasized the need to dynamically return memory from the process space to the OS.

SUMMARY OF THE INVENTION

In view of the foregoing, and other, exemplary problems, drawbacks, and disadvantages of the conventional systems, it is an exemplary feature of the present invention to provide a structure (and method) to provide an automatic ASM solution that exemplarily focuses on Java applications but is applicable to any application runtime environment (ARE).

It is another exemplary feature of the present invention to provide a VM memory management mechanism based upon using JVM metrics to infer workload performance of the concurrently-operating VMs.

It is another exemplary feature of the present invention to provide a virtual memory controller that manages memory as an elastic resource similar to computing cycles for Java applications.

It is yet another exemplary feature of the present invention to provide a virtual memory controller that fairly allocates, among a plurality of collocated VMs, all of the memory available for allocation for the VMs.

In a first exemplary aspect of the present invention, to achieve the above features and objects, described herein is a method including receiving, through an interface of an application runtime environment (ARE), a first set of internal operational metrics of the ARE executing at a current setting S1 on a processor of a computer; determining a first performance P1 of the ARE at the current setting S1 using the received first set of internal operation metrics; varying the current setting S1 of the ARE to a new setting S2; receiving, through the interface of the ARE, a second set of internal operational metrics of the ARE executing at the new setting S2; determining a second performance P2 of the ARE at the new setting S2 using the received second set of internal operation metrics; and re-allocating a memory allocation for the ARE based on the determined performances P1 and P2.

In a second exemplary aspect of the present invention, also described herein is a method including measuring continuously a performance $P_i$ of each application runtime environment $ARE_i$ of a plurality of AREs currently executing in a system at current settings $S_i$, each $ARE_i$ comprising a process being executed by a processor on a computer and having an interface for selectively reporting current values of a set of internal operational metrics; varying the settings $S_i$, respectively, for each $ARE_i$, an amount above or below a target setting $T_i$ for each $ARE_i$, to calculate the performance $P_i$ at the varied setting $S_i$ for each $ARE_i$; and re-allocating memory to the AREs, as based on the performance calculations.

In a third exemplary aspect of the present invention, also described herein is a method including measuring continuously a performance $P_i$ of each application runtime environment $ARE_i$ of a plurality of AREs currently executing in a system at current settings $S_i$, each $ARE_i$ comprising a process being executed by a processor on a computer and having an interface for selectively reporting current values of a set of internal operational metrics; and allocating an amount of memory for each $ARE_i$, as based on adjusting settings $S_i$ of the AREs, so that a relative performance slope $R_i$ of each $ARE_i$ is substantially equal.

BRIEF DESCRIPTION OF THE DRAWINGS

The foregoing and other purposes, aspects and advantages will be better understood from the following detailed description of a preferred embodiment of the invention with reference to the drawings, in which:

FIGS. 5A-5F show performance curves 500 that demonstrate dithering and memory re-balancing when the workload intensity of one JVM increases;

FIGS. 8A-8F show performance curves 800 that demonstrate dithering and memory re-balancing when the workload intensity of one of the collocated JVMs increases;

FIG. 9 shows in flowchart format 900 the concepts described in the present invention;

DETAILED DESCRIPTION OF EXEMPLARY EMBODIMENTS OF THE INVENTION

Figure 1:
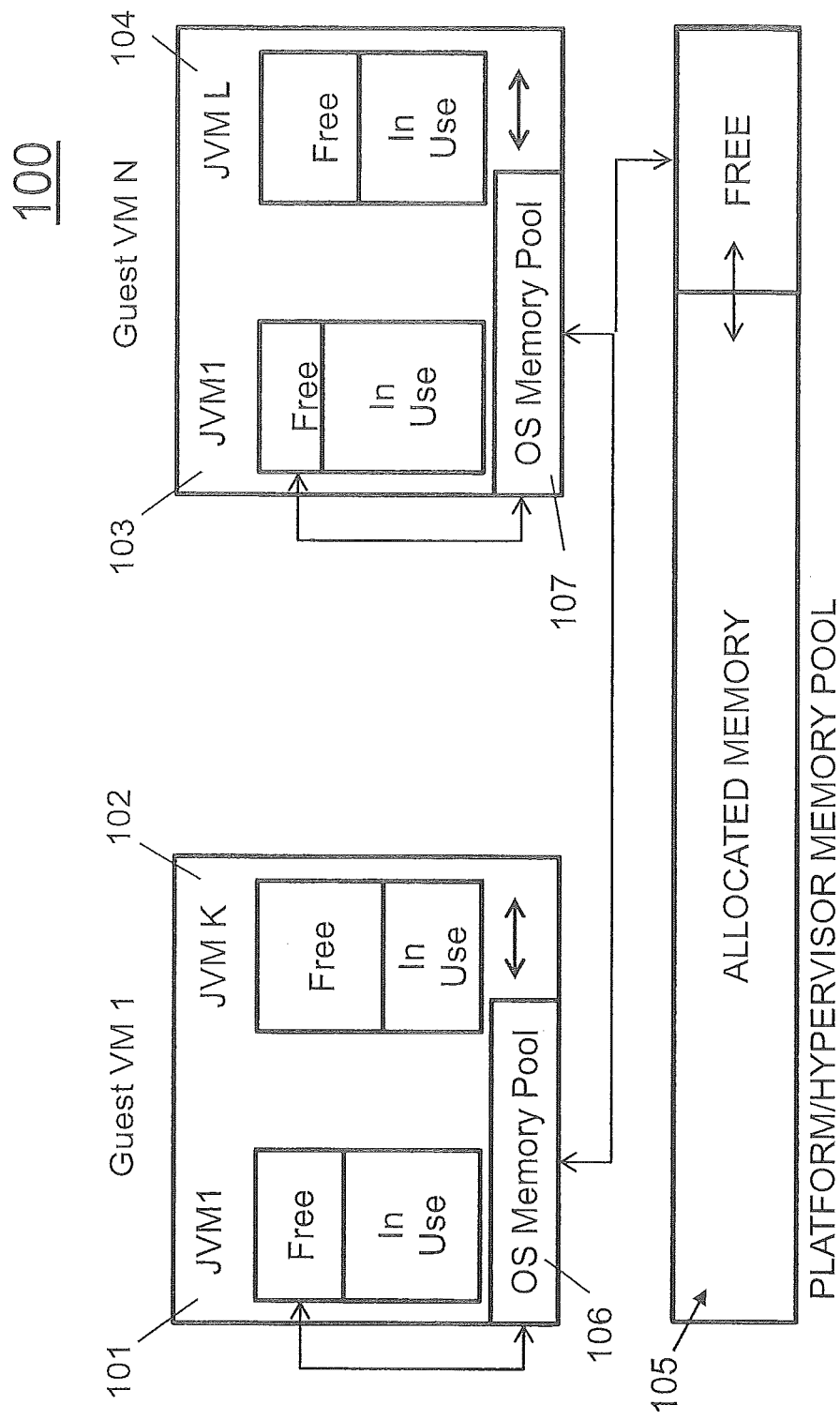
FIG. 1 shows an exemplary system view 100 of elastic memory for explaining the present invention in the exemplary context of JVMs.
Figure 2:
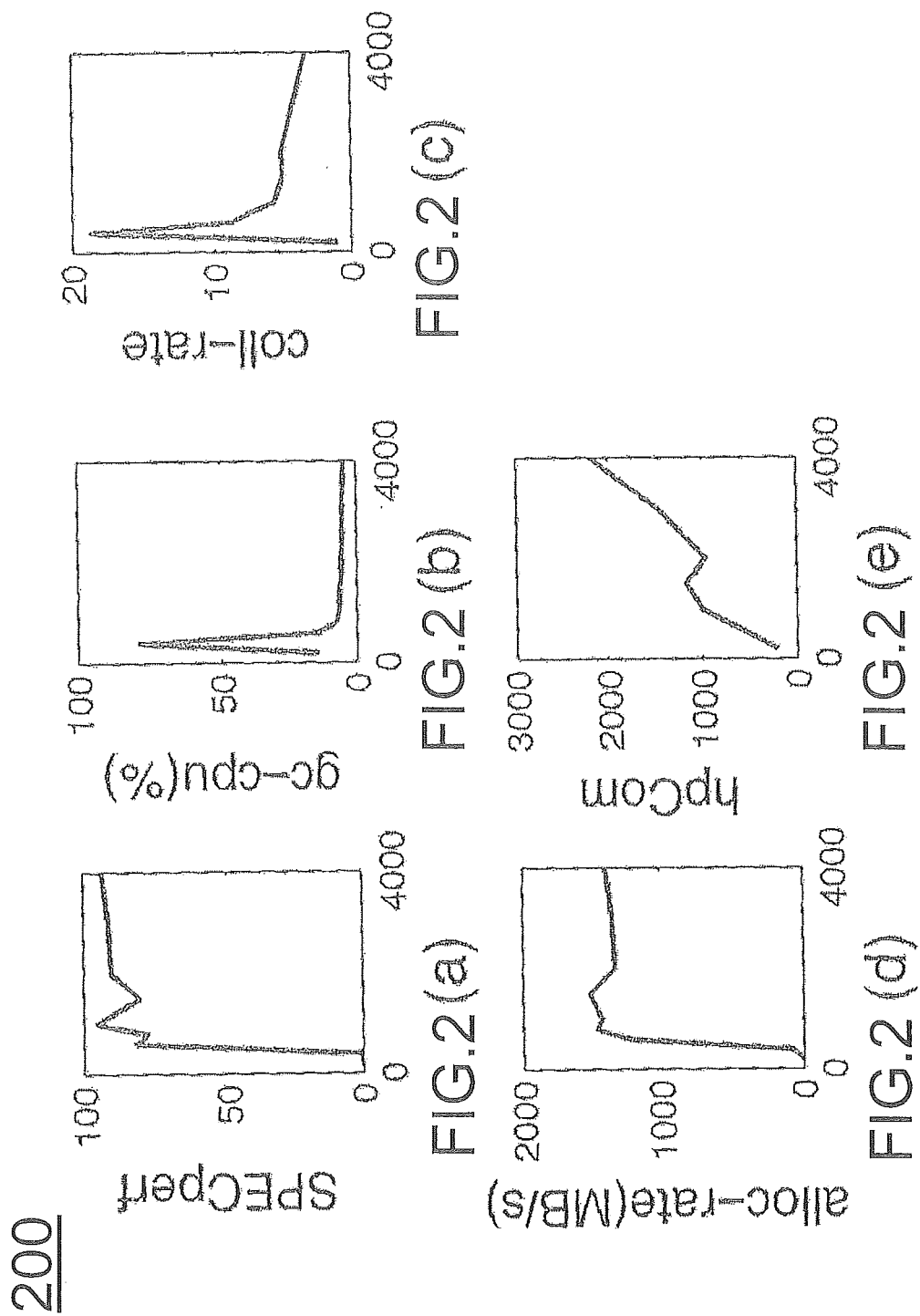
FIGS. 2(a)-2(e) show exemplary experimental data set 200 of one of the benchmark experiments, that suggested to the inventors to use allocation rate as the JVM metric to be used for online operation of a JVM memory controller.

Referring now to the drawings, and more particularly to FIGS. 1-12, an exemplary embodiment involving JVMs will now be described.

The present inventors have recognized that the widespread use of the JVM as a server application platform opens an opportunity to extend the scope of ASM into the application layer. Emerging JVM technologies such as memory ballooning and dynamic heap sizing provide mechanisms to release committed memory from the virtual heap space. Given these advances, the present inventors considered that it was an appropriate time to visit the architecture and control functions required for an automatic ASM solution for JVMs that focuses on Java applications but would also be applicable to other Application runtime environments (AREs).

Accordingly, the present invention introduces a methodology and an implementation for actively sizing the real memory mapped into each JVM during execution. An important feature of the approach is that the measurement and the system model that underlie the control system do not utilize application specific key performance indicators (KPI).

Instead, internal JVM metrics obtained via the Java Management Extensions (JMX) interface provide information on how JVM memory translates into the JVM component of application performance. The connection between JVM metrics and application performance will be further explained in the following discussion.

Also to be described herein is a control system that uses these internal JVM metrics to actively apportion memory between collocated Java applications. When total memory is constrained, the controller achieves fair sharing of memory by equalizing the marginal performance value of collocated JVMs. A dithering technique is applied to overcome challenges arising from the nonlinear and noisy nature of the JMX metrics.

A number of experiments, further described in a technical article scheduled for publication shortly after filing of this application and incorporated herein by reference, have led the present inventors to conclude that a JVM's current performance can be determined from JVM metrics related to current memory usage of that JVM and that such calculated performance can serve as a basis for fairly allocating to a plurality of concurrently-operating VMs the entirety of the memory that can be shared among the plurality of VMs.

However, before summarizing results of these experiments in more detail, the following initial brief discussion provides background and motivation for the approach taken in the present invention of using internal JVM metrics rather than conventional methods.

FIG. 1 exemplarily shows a general platform 100 that can be used to investigate active memory sharing (AMS) in a virtual environment. From a logical perspective, the figure is a tree with application JVMs 101-104 at the top, and the hypervisor memory pool 105 of a physical machine (PM) at the root. One or more collocated JVMs is hosted by an operating system (OS). Each OS 106, 107 apportions its memory pool to processes (JVMs and other applications), free pools, and system cache.

In turn, the operating systems share the common physical platform memory 105 indicated by the hypervisor pool. The concept is that memory flows slowly down the tree to the OS and hypervisor pools on the non-critical path. This is similar to background use of the page-out daemon. In contrast, the flow of memory up the tree is on the critical path, quickly satisfying response to demand.

The present invention provides a mechanism to actively move memory between JVM-based applications and the OS to allow collocated JVMs to effectively share the current OS memory. As memory is added or removed from the OS, or one of the workload changes, the control system responds to fairly apportion the constrained memory.

VM Memory Management

Many conventional logical memory overcommit solutions are directed at dynamic allocation of memory by the hypervisor to the OS layer. For example, one conventional mechanism addresses the memory management under VMWare ESX. This mechanism uses copy-on-write for content-based sharing within a VM and across VMs to reduce memory demand on a PM. It also uses the "ballooning" technique to control and re-balance of memory used by VMs.

IBM products also support active memory sharing across VMs based on both software and firmware features, for example, on the PowerVM and z/VM systems. To right-size the VMs, one conventional mechanism used a page sampling technique, whereas another conventional mechanism used swap space and memory access monitoring, and yet another conventional mechanism used a memory controller with feedback information on memory allocation and utilization while maintaining QoS objectives.

Active JVM Memory Management

Two methods are currently available to release unused heap memory in the JVM to the OS. The JVM balloon method adds a dynamic link library to the JVM that supports a Java Native Interface (JNI) call. JVM ballooning is described elsewhere, for example, in papers that describe the Ginko system. VMWare's EM4J is a commercial offering of the balloon mechanism that can plug into JVM's from Oracle and IBM.

Unlike ballooning, the present invention uses direct resizing of the JVM heap to release memory to the OS. This technology has been built into the IBM J9 JVM since version 7.0. A detailed explanation of the method used to leverage this JVM control knob, MaxHeapSize, to actively control heap memory, is provided below.

A few recent studies have focused on the application level memory management in VMs. For example, the Ginkgo system uses an application-driven memory overcommitment system. It uses a memory performance model based on collected application performance and memory size data.

In another mechanism, an application level ballooning controller is designed in the Xen-based environment. It included exemplary data on the impact to response time by varying memory allocations to two applications: the memory buffer allocated to a database (mySQL) for TCP-H benchmark, and the heap memory for the XMark XLM benchmark.

In yet another approach, a VM memory management mechanism used in CRAMM enables dynamically choosing of JVM heap sizes to meet workload demand, while avoiding latency in paging. Based on empirical results for a set of applications, it establishes the correlation between heap size and working set size, and between heap size and application performance (e.g. elapsed time).

The Approach of the Present Invention

Unlike the approaches used in these prior mechanisms, the present inventors conducted a number of experiments that indicated that JVM performance metrics obtained through JMX correlated with the memory usage of application processes and could be used to calculate a proxy for the VM performance. The JVM metrics used are generic to many JVMs with a variety of garbage collector (GC) policies. Therefore, the present invention takes the innovative approach of using internal JVM metrics as the basis of a novel JVM memory management mechanism.

Unlike the previous approaches summarized above, the present invention describes two novel aspects of JVM memory management:
  the use of JVM metrics as application performance indicators, as a proxy for application performance; and
  the active sizing of the heaps of collocated JVMs in response to OS level resource changes and workload variability, thereby providing a new mechanism for moving or reallocation of memory between JVMs and underlying a new control system for JVM memory management.

JVM Metrics as Proxies for Application Performance

The present inventors focused on using JVM metrics as proxies for application performance for several reasons. Most Java processes and applications do not maintain internal measures of their rate of progress. Of the minority that do, few expose these performance APIs in a standard format. Even when made available, the interpretation of the key performance indicators (KPIs) requires domain-specific knowledge. For example, transaction processing services often support a mix of incoming request types that require varying back-end resources to satisfy. A shift in workload composition from query requests to updates can change KPI's in a way that needs to be understood by a controller of every application in the system to tune across all applications and systems.

End-to-end application performance may depend on additional factors to that of the JVM. For example, the database tier may be slowed because of insufficient OS system buffers. Note, however, that the effect of a slow database tier on a Java application tier will generally manifest itself in the JVM metrics, such as rate of object allocation, since the application cannot make progress. In this example, the local controller gives the JVM less memory than if the JVM tier was running at full load. It is reasonable that the unassigned memory makes its way to the database server via the flow of FIG. 1. An approach of local independent controllers, such as the one presented in the present invention, does not preclude collaboration with controllers at other levels to achieve global optimization.

JVM Direct Page Releasing Mechanism

The present inventors have recognized that IBM's J9 JVM contains a memory release mechanism that can be leveraged for the present invention. When J9 starts, it reserves a contiguous region of virtual process space for its heap. The virtual heap is sized by the JVM startup command line parameter setting -Xmx. The -Xmx setting is the MaxHeapSizeLimit and is the largest size the heap can reach. The J9 JVM maintains a second, soft, heap maximum setting called the MaxHeapSize whose operation is summarized below.

MaxHeapSize can be set at any time during JVM execution to a value less than the MaxHeapSizeLimit using the Java Management Extensions (JMX) API. The JVM's memory manager for balanced garbage collection (GC) policies actively attempts to maintain contiguous free regions at the top of the heap's virtual memory space. Internally, the memory manager tries to adjust to new settings of MaxHeapSize as its heap maximum. When the portion of the virtual heap in use exceeds MaxHeapSize the memory manager attempts to use compacting GC, and relocation of its generational regions to fit inside the current MaxHeapSize.

If the active heap fits under MaxHeapSize, any physical memory mapped into the virtual heap region from MaxHeapSize to the top of the virtual heap at MaxHeapSizeLimit is released to the OS. In this case, MaxHeapSize becomes the heap limit, and all internal memory management algorithms are sized by this value.

When the JVM memory manager cannot reduce the heap to fit under the MaxHeapSize setting, the heap remains sized to the last successful setting, and will continue to attempt to meet the new setting as pattern of application memory changes.

MaxHeapSizeLimit (read only) and MaxHeapSize (read/write) are exposed programmatically through the MemoryBean of JMX using the getMaxHeapSize(Limit)( ) and setMaxHeapSize( ) methods. They are also available interactively through the Java GUI utility JConsole. These APIs are used by the controller described below.

Analyzing the JVM Metrics and Application Performance Relation

A key aspect of the present invention is that decisions about the effect of JVM memory on the Java component of the workload can be based on JVM metrics, rather than from key performance indicators (KPI) provided by workload instrumentation that is typical of various conventional VM memory management systems previously described. The following discussion provides a brief summary of the experiments and analysis of the correlation between JVM metrics and the workload performance (e.g., business operations per second—bops), which serves as the basis for the present invention. The goal was to understand and possibly utilize the JVM metrics as proxies for the benchmark performance data, to permit a mechanism to correctly size the JVM memory for each workload.

Metrics Collected from the JVM

Each JVM metric considered to be potentially of interest during development of the present invention is listed with those that proved most useful in evaluating the JVM contribution to application performance at the top of the list.

Mem-freed—The cumulative number of bytes collected by the garbage collector (GC) since a JVM startup.

Heap-inuse—Current amount of the heap memory containing objects with live references.

Heap-committed (hpCom)—Current memory mapped to the virtual heap.

GC CPU—The fraction of the system CPU cycles spent in GC. Since GC may be multithreaded and concurrent on multiple cores, the GC CPU percent reported is the sum of the time spent on each of the GC threads normalized to the wall clock time and the number of cores. A decrease in GC CPU often provides an indication of whether adding memory is benefiting the application.

Collection rate (coll-rate)—The number of GCs reported by the JVM over the sampling interval. The algorithm that determines when GC occurs is internal to the JVM. While it is a black box statistic, it appears in the data from the inventors' experiments to be a consistent indication of memory pressure.

Allocation rate (alloc-rate)—This measure is not directly reported by JMX but is derived from the inuse-heap and mem-freed metrics. It is the rate of memory allocated during an interval and is computed in the sample interval [t1,t2] using the allocated bytes: alloc-rate= [inuse-heap(t2)−inuse-heap(t1)+memfreed(t2)−memfreed(t1)]/[(t2−t1)].

This derived allocation rate proved to be a very useful measure: when an application is slowed, that slowing is reflected in the allocation rate. The allocation rate was found to generally be more stable than the mem-freed measure, as it does not depend on when JMX happens to take a sample of the JVM metrics. For example, a GC cycle just before or just after taking a JVM metrics sample will yield a different memfreed, but the allocated memory will be the same. It is noted that, over long time intervals, the men-freed and allocation rate have to be in equilibrium otherwise the JVM memory is exhausted as would be the case of a memory leak. This approach or other similar approaches can be used to derive one or more metrics for memory usage analysis.

Memory Intensive Workload Benchmarks

In the experiments further described in the technical publication, two benchmark groups were used to establish the correlation of the JMX metrics and workload performance. SPECjvm2008 contains over 20 individual benchmarks that cover a wide range of applications. Of these, the 10 which used more than 128 MB of committed heap are considered memory intensive. The excluded set in this group used less than 50 MB opt committed heap. SPECjbb2005 is representative of a traditional transactional workload. With ten warehouses it used up to 2000 MB (2 GB) of memory and sustained over 1000 MB/sec in allocation rate.

Experimental Procedure

The studies were carried out on an AIX Power 7 virtualized platform. Each virtual machine was allocated two physical cores with a simultaneous multithreading (SMT) level of 4, such that the OS and JVM see eight logical processors.

Initially, 5 GB was typically assigned to each VM, but memory allocation could be dynamically varied using the hypervisor API. The IBM J9 JVM is configured to use the balanced GC policy described in the present invention. The balanced policy was selected because it incorporated the dynamic control of the heap maximum through the MaxHeapSize system control variable discussed previously. The benchmarks were profiled over successive runs with the JVM heap max stepped from 256 MB to 4000 MB.

Results of the Experiments

The correlation between the SPECjvm2008 benchmark performance and the JVM metrics was explored as a function of the MaxHeapSize parameter.

These experiments suggested that decisions about the benefit to the application of additional memory should be made on the basis of the observed change in memory-related JVM metrics as memory is added to the JVM, rather than on the metric values themselves. Consider, for example, the threshold pattern near the threshold where performance changes rapidly in FIG. 2(a). Adding memory clearly benefits the application, and this behavior is also seen in the simultaneous improvement in allocation rate, shown in FIG. 2(d). If the allocation rate does not improve, that failure of improvement is a strong indication that the extra memory does not benefit the application.

The present inventors were searching to identify one or more JVM metrics that would correlate well with the benchmark performance. After correlating experimental results, it was determined that the allocation rate would be the most consistent single indicator of performance.

Active JVM Memory Control

Since memory allocation to JVM (e.g. MaxHeapSize) is important for the application performance in JVM as workload varying, the following discussion describes the design, development, and testing of a novel JVM memory controller based on the experimental results described above. The controller takes actions to re-apportion memory among collocated JVMs when the available OS memory is constrained and workload changes.

Principle of Operation

The memory apportion objective of the JVM memory controller described herein is to "fair share" the current available memory between collocated JVMs. The fair sharing condition is defined as: equal changes in the MaxHeapSize of each JVM result in equal changes in the relative performance of each JVM. Thus, the relative performance slope (S) for each JVM (j) is defined as the slope of the curve of the application performance (Pj) against MaxHeapSize, normalized by the performance value:

$$S_j = \frac{\Delta P_j}{\Delta MaxHeapSize_j} \times \frac{1}{P_j}.$$

The controller of the present invention reallocates memory by actively setting $MaxHeapSize_j$ such that the relative performance slope $S_j$ is the same for all j, using JVM metrics to measure the application performance Pj. The discussion above exemplified that allocation rate was determined as a result of the experimentation as a strong candidate for an application performance proxy. This open loop data were then used to evaluate the JVM metrics in the slope equalizing algorithm.

Figure 3:
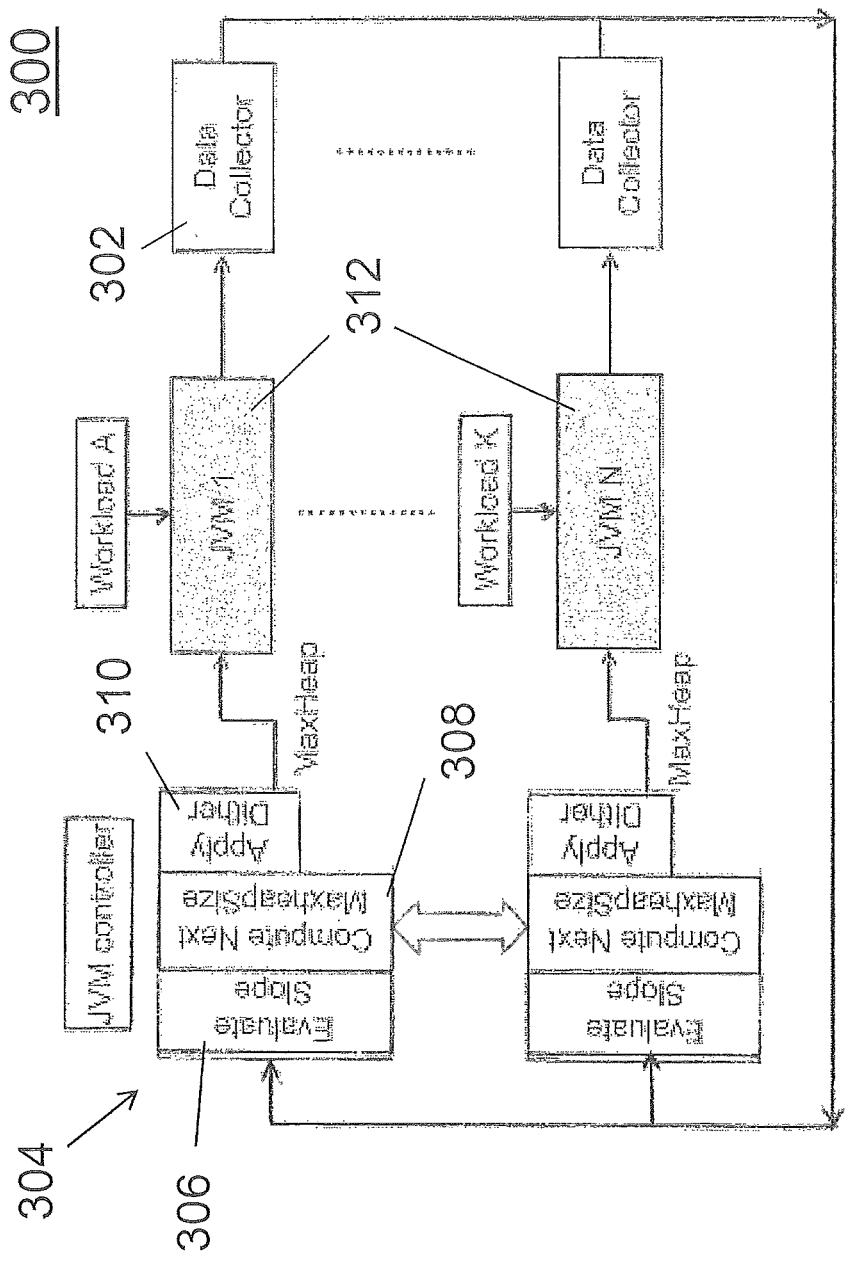
FIG. 3 shows an exemplary architecture 300 of main components of the memory controller of the present invention.

This experimental data had the advantage that the SPEC benchmark performance KPIs were also available to establish the correct baseline behavior. Therefore, additional testing was used to confirm that the allocation rate metric produced the closest agreement to the SPEC KPIs, thereby further validating the inventor's initial conclusion to use the allocation rate metric for the online operation of the controller of the present invention Controller Architecture FIG. 3 provides a functional block diagram 300 of the main elements of the measure-analyze-control cycle that tracks workload memory demand and actively sets the MaxHeapSize parameter of each JVM. On the right of the figure is the data collector 302 which uses JMX to poll the data from the JVM. The typical polling interval is 5 seconds.

The JVM metrics are fed into the control module 304 on the left. It consists logically of three parts: the slope evaluator 306; the Compute Next MaxheapSize module 308 that estimates the next MaxHeapSize value based on the current state; and the dither function 310.

The controller 304 was written in Java to utilize the available JMX packages and to leverage a standard internal JVM feature that detects the presence of collocated JVMs. The data collector and controllers 304 for all collocated JVMs 312 in a single lightweight JVM process used less than 0.1% CPU and 20 MB of memory. The collector and controller can be integrated into the JVM itself to provide a scalable and highly available architecture.

Function Details

A key function of the controller 304 of the present invention is to locate its position on the curve of allocation rate against the MaxHeapSize parameter at the current workload. To accomplish this, the controller modulates the MaxHeapSize parameter about its current target value; this technique is referred to as "dithering." A dither point is selected above and below the target MaxHeapSize. Experiments explored the tradeoff in which moving the dither points too far away resulted in oscillations in JVM performance, while keeping them close yielded a poor control speed. For example, a reasonable tradeoff is achieved with the lower point at 80% of the current target MaxHeapSize, and the upper point at 120%.

Figure 4A:
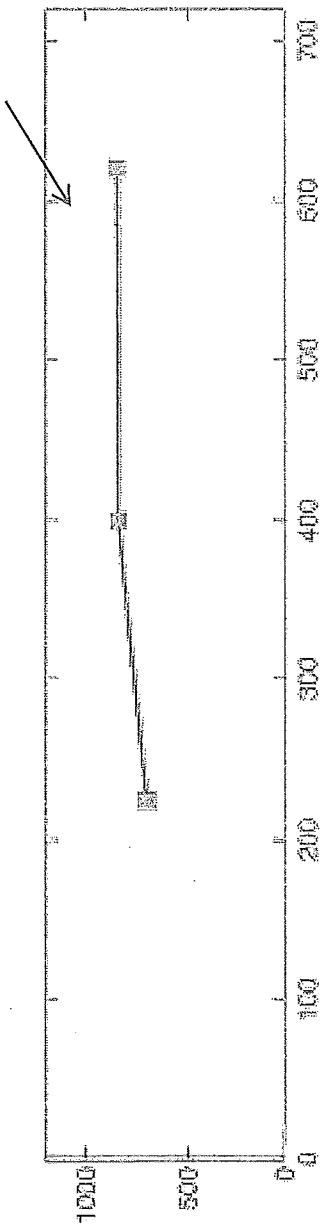
FIGS. 4A-4C show snapshots 400 of dithering points as memory is removed from a JVM.
Figure 4B:
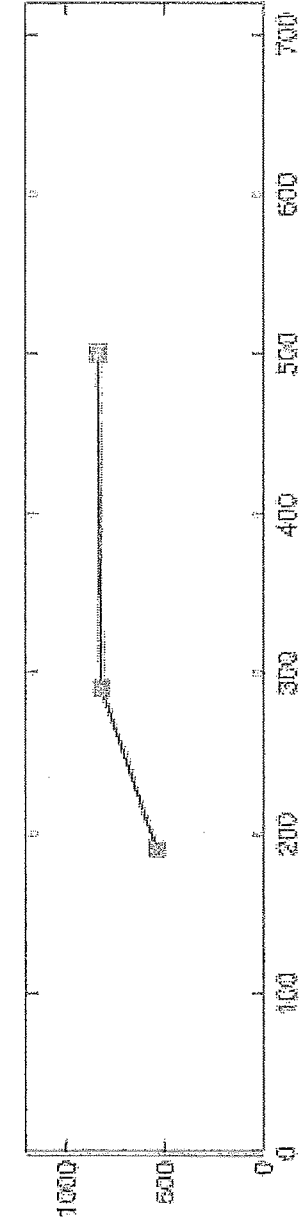
Figure 4C:
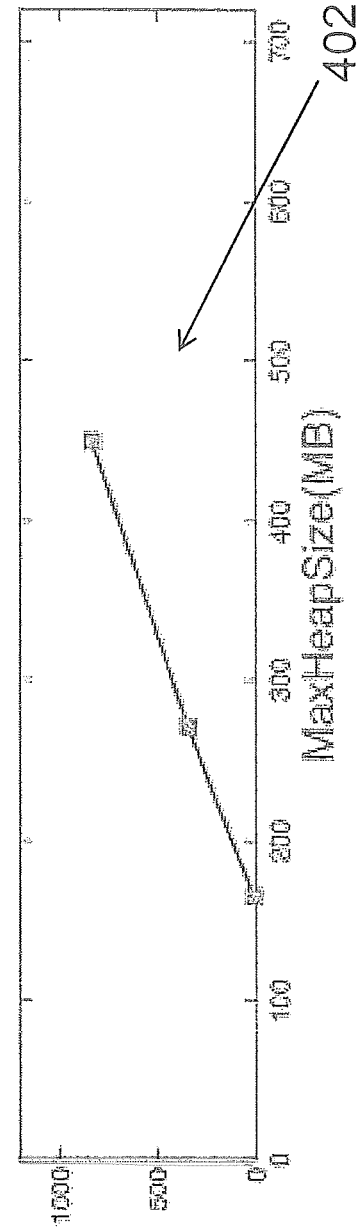

FIG. 4 (i.e., FIGS. 4A-4C) illustrates operation of the collection of data using dithering when running the derby benchmark as memory is removed from the system. Each subfigure 4A-4C is a snapshot of the data showing the three measured allocation rates generated by dithering. The three dither points are acquired on sequential measurement cycles about 5 seconds apart. Note that this also means that at any time the three points do not necessarily lie at 80%, 100%, and 120% of the target MaxHeapSize as the target may have changed at each measurement cycle. Consequently, the three measured dither-points in the curve window may not lie on a locally convex curve. This situation is improved by relying more on the latest measurements than on older ones. We first remove the oldest dither point and construct a single line, thus making the slopes for performance gain and loss equal. If even this single line yields a negative slope, we drop the next oldest point, i.e. we use only the newest dither point and construct a flat line through it, with slope 0. An example of this is shown in FIG. 5 (e.g., FIG. 5A-FIG. 5F), where in the middle left the workload is varying too much, resulting in the measurements at the time instance shown (FIGS. 5A-5C); in this case a flat line was constructed and used in the re-balancing algorithm.

The relative slope of the allocation rate—MaxHeapSize curve, is evaluated using the three points. It is difficult to fit an analytic function such as an exponential, because the fit was too sensitive to the jittery nature of the data. This is especially true in the "plateau" of the curve where the jitter over the dither range may exceed the change in the underlying performance curve. The jitter is caused by multiple sources including sampling noise, garbage collection cycles, and OS activities. The current implementation uses a piece-wise linear fit, which in essence approximates an arbitrary function locally, but other fitting techniques are also possible.

FIG. 4 shows there are critical and noncritical regions of control. In the critical region, at the bottom 402 of the figure (e.g., FIG. 4C), the slope is steep indicating the high value of additional memory to the application. In the noncritical region at the top 404 of the figure (e.g., FIG. 4A), memory is not as valuable. Fortunately, the main difficulties caused by noise and jitter in measuring slope occur in the noncritical region of controller operation where the slope is low. Here, the slope measurement is sensitive to system noise in the data and fitting is employed to reduce the error, as described below. The slope data are fed into the controller 304 which computes, in module 308, the subsequent value for the MaxHeapSize control to the JVM.

Memory Balancing Methodology

The 'Compute next MaxHeapSize' module 308 of FIG. 3 computes the next set of target MaxHeapSize values to input into the JVMs based on the current system state. This module also detects the presence of existing and new JVMs through the JMX interface. New JVMs are given a warmup period of about a minute before being added to the control loop. At the end of the warmup cycle the JVM is given an initial MaxHeapSize target of 20% above it observed committed memory level.

The Compute target MaxHeapSize module 308 executes the following procedure during each measurement and control cycle:

1. Check the available OS memory—If memory has been added or removed to the OS, as shown in FIG. 1, that memory is apportioned to the JVMs according the principle of equalizing the slopes.

2. Adjust the target MaxHeapSize—The current algorithm uses an iterative, greedy procedure to estimate the new set of HeapSizeMax values that equalize the slopes. At each step, memory is taken from the JVM with the lowest slope—and would be least impacted—and moved to the JVM with the steepest slope. The iterative computation is ended under either of two conditions: i) for any JVM, memory is not given past the current upper dither point; and memory is not taken away past the lower dither point; ii) the deviation from the equal slope condition across all JVM's no longer improves. Limiting the range of the MaxHeapSize adjustment during each control cycle slows the step response, but reduces the risk of destabilizing performance.

Figure 6:
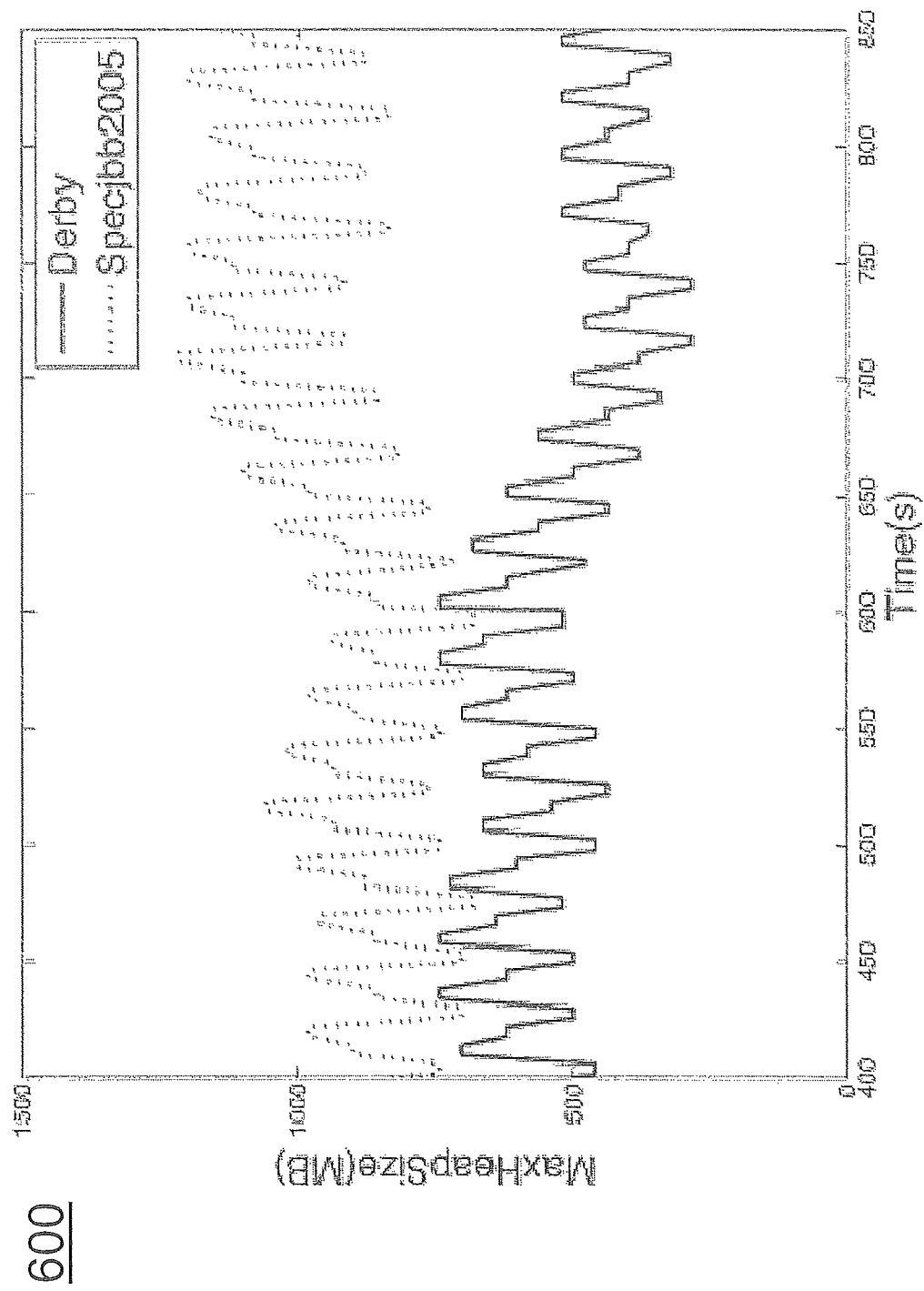
FIG. 6 shows data 600 demonstrating the MaxHeapSize control parameter, including dithering, for two different collocated workloads.

3. Select the dither points for each JVM—the direction and value of the dither is chosen for each JVM so that at any time the sum does not exceed the total available memory. Each dither point (lower, center, upper) is assigned a "cost of renewal", defined as how recent the dither point was active. The oldest dither points will thus have the lowest cost, and are assigned to be updated before newer ones. The global optimal assignment is an exhaustive search of all possible assignments, choosing the combination with the lowest total cost that does not exceed the total available memory. With three dither points per JVM, an exhaustive search of up to at least 15 JVM's is not a computational problem for this exemplary embodiment. FIG. 6 shows the phase offset 600 between the dithering pattern two located JVMs.

4. Execute the final decisions of how to set MaxHeapSize for each JVM, by calling the setMaxHeapSize( ) method on the IBM implementation of the MemoryMXBean.

Experimental Results

Figure 7:
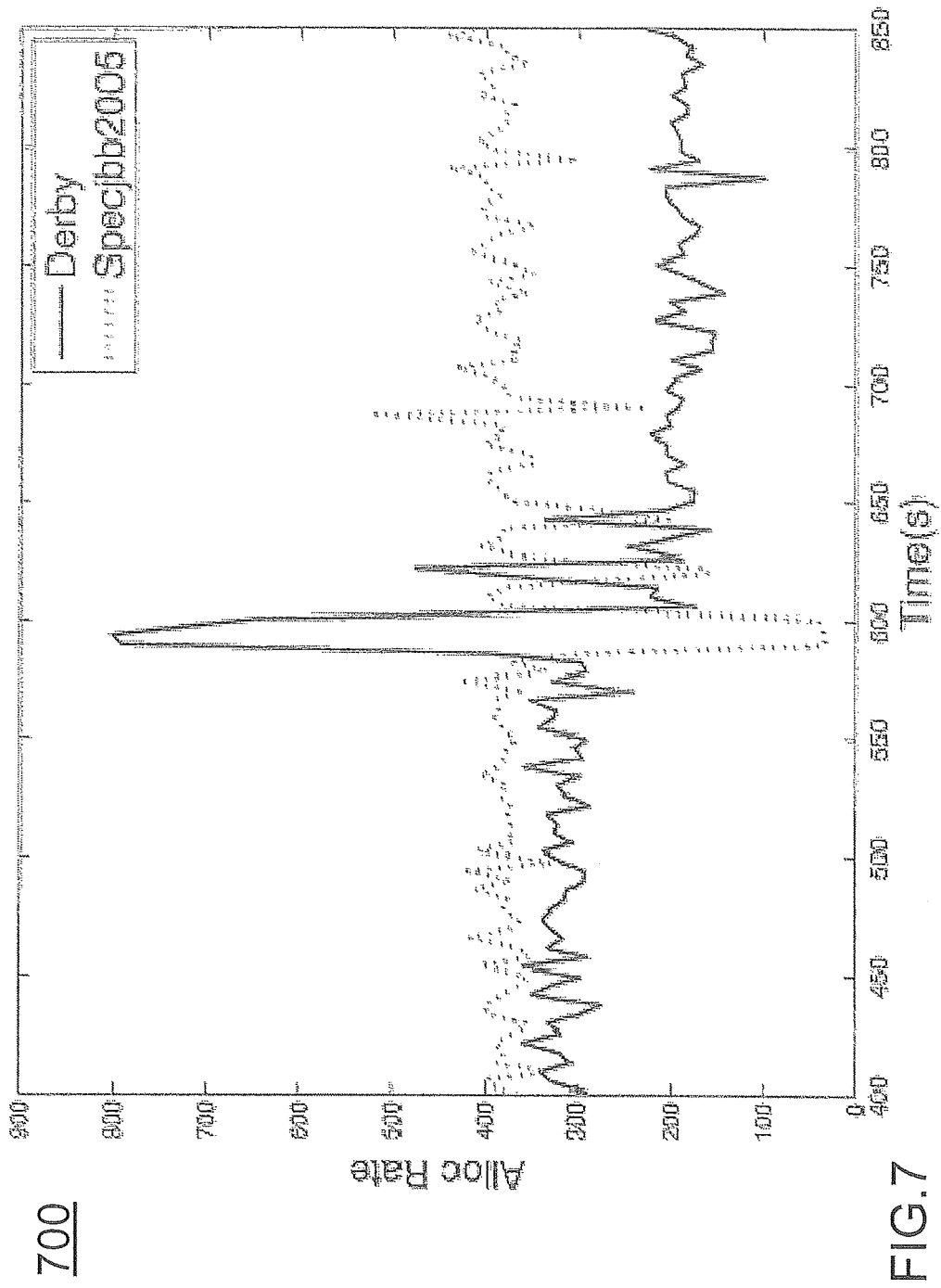
FIG. 7 shows data 700 demonstrating the allocation rate metric for collocated workloads, including a step response of the control system around 580 seconds for an increase in demand for one of the workloads.

The controller is evaluated using collocated JVMs running the SPECjvm2008 derby and the SPECjbb2005 transactional benchmarks. FIG. 7 shows the allocation rate 700 of each benchmark. The total memory constraint for the two JVMs is 1.5 GB.

For the first 580 seconds the workload is constant, with the SPECjbb2005 running 10 warehouses. The variability in the allocation rate in during this period is mostly due to different phases in the underlying workload and provides an idea of the short term jitter in the system. At 580 s, the number of SPECjbb2005 warehouses changes from 10 to 20. This introduces a step like change in demand for memory. The resulting behavior and time to settle is a key evaluation of controller performance. There is some oscillatory behavior in the application behavior which settles within an exponential window of about 80 s. Coincident with the change in allocation rate, the process CPU followed a similar pattern (not shown in the figure), with about a 13% shift from Derby to Specjbb2005.

FIG. 6 shows the corresponding control signal of MaxHeapSize sent to each JVM during the run. The dither signal is clearly seen imposed on the average MaxHeapSize control signal. Comparing the strength of the dither to the allocation rate data of FIG. 7 indicates the dither does not affect the application performance, as is desired.

FIG. 8 contains more detail 800 about the slope evaluation function of the controller during this run. The top FIG. 8A and FIG. 8D show the balanced situation before increasing the load on SPECjbb2005, the center plots FIG. 8B and FIG. 8E right after increasing the load, and the bottom FIG. 8C and FIG. 8F show when the rebalance has taken place. It can be seen that in a balanced situation (top and bottom) the two curves have a similar slope, while just after increasing the load on SPECjbb the slope of the SPECjbb curve is then steeper (FIG. 8E).

As briefly mentioned at the beginning, the present invention provides a new mechanism that applies more generally than the specific application of a JVM. FIG. 9 shows in flowchart format 900 this broader mechanism that can be applied in any application runtime environment (ARE) that is defined as meaning any process being executed by a computer that has an interface to report internal parameter values for that process. The JVM is, therefore, only one exemplary ARE for which the present invention applies. Additionally, in the context of the present invention, there must be some aspect of this process that can be affected by changing a value for a predetermined parameter, thereby providing a mechanism for "setting" the ARE. In the exemplary embodiment of the JVM, the parameter used for making settings for the JVM was maxHeapSize.

Finally, the ARE would have to possess some characteristic that can be optimized by making changes to its setting parameter. In the case of the JVM, this optimization was directed to detecting how performance of the JVM changes as memory is reallocated to the JVM. It is noted that the mechanism described in the present invention could be used for characteristics other than performance of the ARE operation. For example, the mechanism might be modified for purpose of detecting how many additional collocated AREs (e.g., JVMs) could be supported by the underlying hardware.

Accordingly, turning to FIG. 9 and presuming the mechanism is intended for the specific purpose of memory allocation of an ARE, in steps 902 and 904 an ARE is instantiated and provided an initial memory allocation and the interface is used to report current values of one or more internal parameters of interest. In the case of the JVM and the purpose of memory allocation based on performance, the internal parameters determined to be of interest were inuse-heap and mem-freed. It should be noted that, for other purposes, other internal parameters of the ARE process might be used.

As described briefly above, in the case of the JVM, the instantiated ARE process can optionally be operated with an initial "warmup period" to permit its operation to stabilize before making changes in its setting parameter, a concept that is well understood in the art when feedback loops are implemented.

In step 906, the current parameter values are used to calculate an aspect of interest of the ARE. Thus, in the JVM embodiment, the current values of inuse-heap and mem-freed are used to calculate allocation rate. As should be clear from the JVM embodiment, additional techniques might be necessary to detect the ultimate aspect of interest for the ARE. Thus, for example, the technique of dithering was used to make changes in settings of the JVM memory allocation, in order to detect the performance of the JVM as based on one or more of its internal parameters.

In step 908, the aspect of interest for the ARE is optimized. In the embodiment of the JVM, the aspect of interest is performance of the ARE as a function of memory allocation. As noted in FIG. 9, the optimization could involve a feedback loop in which steps 904-908 are continuously executed.

As also explained by the JVM embodiment, this aspect of performance for the ARE could involve overall operation of multiple collocated AREs. Thus, optimization of the performance of multiple collocated JVMs involved the procedure of adjusting the setting of each JVM until approximately the same performance slopes were achieved for all collocated JVMs. It should be clear that other optimization procedures would be appropriate under different scenarios. For example, optimization of a single JVM could be achieved differently than optimization of a plurality of collocated JVMs.

Finally, it is noted that the exemplary embodiment using collocated JVMs as the AREs was described as having the memory allocation controller implemented outside the JVM process itself. However, such configuration should not be considered as the only possibility, since the memory allocation controller for each JVM could also be incorporated into the JVM process itself, as long as capability is provided so that the different JVM controllers could exchange information necessary for overall optimization.

The present invention may be a system, a method, and/or a computer program product. The computer program product may include a computer readable storage medium (or media) having computer readable program instructions thereon for causing a processor to carry out aspects of the present invention. It is understood in advance that although the following discussion includes a detailed description on cloud computing, implementation of the teachings recited herein are not limited to a cloud computing environment.

Rather, embodiments of the present invention are capable of being implemented in conjunction with any other type of computing environment, now known or later developed, that supports implementation of VMs. Indeed, much of the following discussion is directed to a more generic computing environment in which the components are not necessarily implemented on a cloud-based platform.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Any flowcharts and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Turning now the possible hardware implementations that would support the methods of the present invention, it is previously noted that the invention could be supported with most computer architectures, including a cloud-based architecture. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 10:
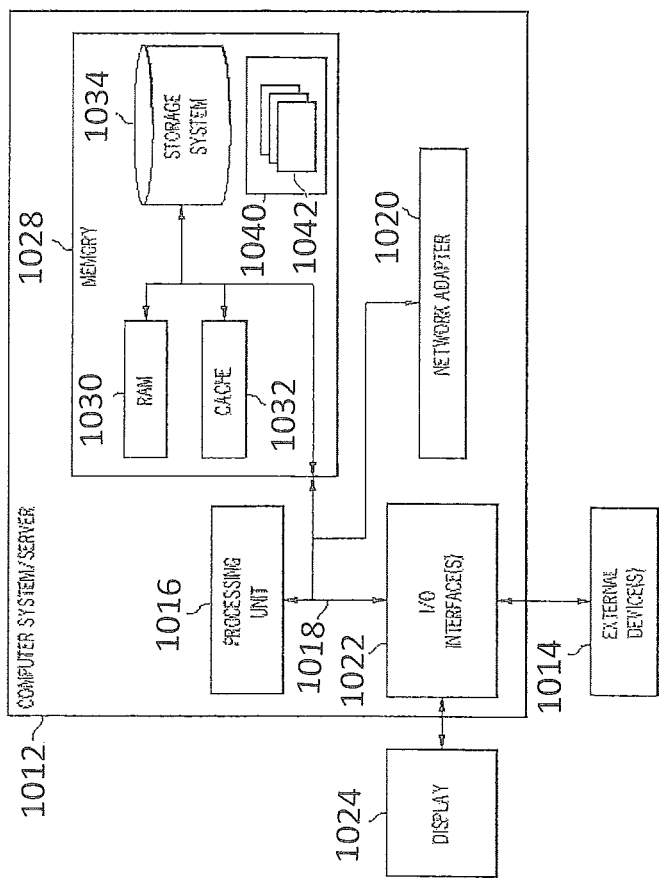
FIG. 10 depicts a computer system 1000, such as a cloud computing node, according to an embodiment of the present invention.

Referring now to FIG. 10, a schematic of an example of a cloud computing node 1000 is shown. Cloud computing node 1000 is only one example of a suitable cloud computing node and is not intended to suggest any limitation as to the scope of use or functionality of embodiments of the invention described herein. Regardless, cloud computing node 1000 is capable of being implemented and/or performing any of the functionality set forth hereinabove.

In cloud computing node 1000 there is a computer system/server 1012, which is operational with numerous other general purpose or special purpose computing system environments or configurations. Examples of well-known computing systems, environments, and/or configurations that may be suitable for use with computer system/server 1012 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 1012 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 1012 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 1012 in cloud computing node 1000 is shown in the form of a general-purpose computing device. The components of computer system/server 1012 may include, but are not limited to, one or more processors or processing units 1016, a system memory 1028, and a bus 1018 that couples various system components including system memory 1028 to processor 1016.

Bus 1018 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 1012 typically includes a variety of computer system readable media. Such media may be any available media that is accessible by computer system/server 1012, and it includes both volatile and non-volatile media, removable and non-removable media.

System memory 1028 can include computer system readable media in the form of volatile memory, such as random access memory (RAM) 1030 and/or cache memory 1032. Computer system/server 1012 may further include other removable/non-removable, volatile/non-volatile computer system storage media. By way of example only, storage system 1034 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1018 by one or more data media interfaces. As will be further depicted and described below, memory 1028 may include at least one program product having a set (e.g., at least one) of program modules that are configured to carry out the functions of embodiments of the invention.

Program/utility 1040, having a set (at least one) of program modules 1042, may be stored in memory 1028 by way of example, and not limitation, as well as an operating system, one or more application programs, other program modules, and program data. Each of the operating system, one or more application programs, other program modules, and program data or some combination thereof, may include an implementation of a networking environment. Program modules 1042 generally carry out the functions and/or methodologies of embodiments of the invention as described herein.

Computer system/server 1012 may also communicate with one or more external devices 1014 such as a keyboard, a pointing device, a display 1024, etc.; one or more devices that enable a user to interact with computer system/server 1012; and/or any devices (e.g., network card, modem, etc.) that enable computer system/server 1012 to communicate with one or more other computing devices. Such communication can occur via Input/Output (I/O) interfaces 1022. Still yet, computer system/server 1012 can communicate with one or more networks such as a local area network (LAN), a general wide area network (WAN), and/or a public network (e.g., the Internet) via network adapter 1020. As depicted, network adapter 1020 communicates with the other components of computer system/server 1012 via bus 1018. It should be understood that although not shown, other hardware and/or software components could be used in conjunction with computer system/server 1012. Examples, include, but are not limited to: microcode, device drivers, redundant processing units, external disk drive arrays, RAID systems, tape drives, and data archival storage systems, etc.

Figure 11:
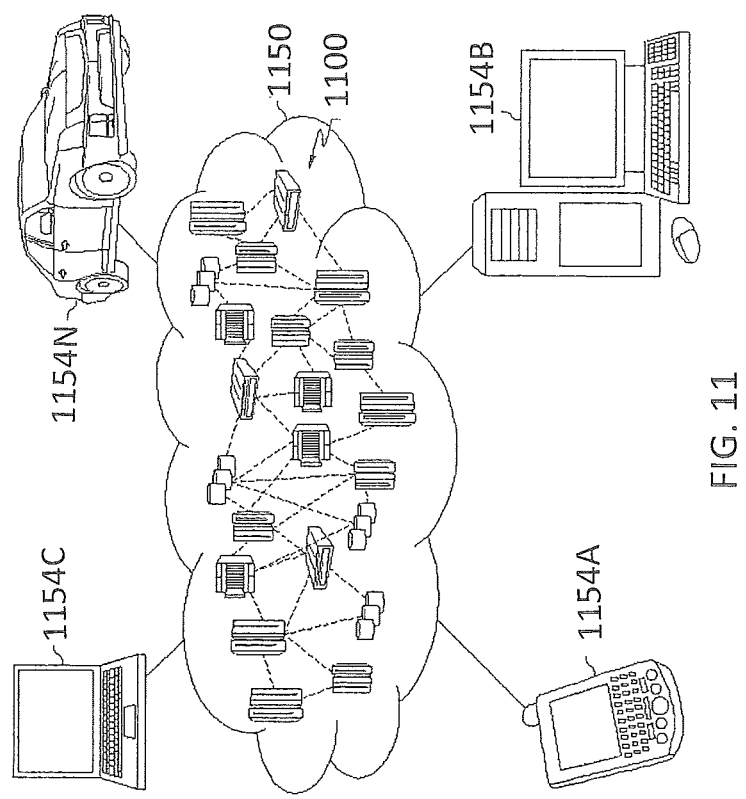
FIG. 11 depicts a cloud computing environment 1100 according to an embodiment of the present invention.

Referring now to FIG. 11, illustrative cloud computing environment 1100 is depicted. As shown, cloud computing environment 1100 comprises one or more cloud computing nodes 1000 with which local computing devices used by cloud consumers, such as, for example, personal digital assistant (PDA) or cellular telephone 1154A, desktop computer 1154B, laptop computer 1154C, and/or automobile computer system 1154N may communicate. Nodes 1000 may communicate with one another. They may be grouped (not shown) physically or virtually, in one or more networks, such as Private, Community, Public, or Hybrid clouds as described hereinabove, or a combination thereof. This allows cloud computing environment 1100 to offer infrastructure, platforms and/or software as services for which a cloud consumer does not need to maintain resources on a local computing device. It is understood that the types of computing devices 1154A-N shown in FIG. 10 are intended to be illustrative only and that computing nodes 1000 and cloud computing environment 1100 can communicate with any type of computerized device over any type of network and/or network addressable connection (e.g., using a web browser).

Figure 12:
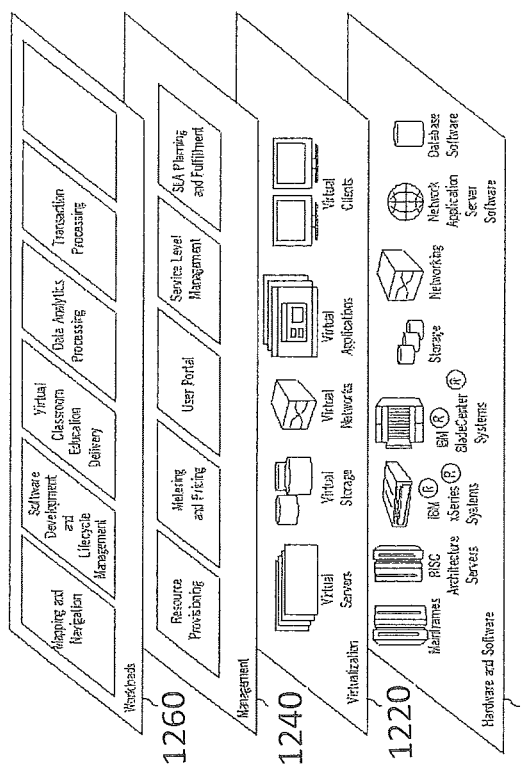
FIG. 12 depicts abstraction model layers 1200 according to an embodiment of the present invention.

Referring now to FIG. 12, a set of functional abstraction layers provided by cloud computing environment 1100 (FIG. 11) is shown. It should be understood in advance that the components, layers, and functions shown in FIG. 12 are intended to be illustrative only and embodiments of the invention are not limited thereto.

As depicted, the following layers and corresponding functions are provided:

Hardware and software layer 1200 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 1220 provides an abstraction layer from which the following examples of virtual entities may be provided: virtual servers; virtual storage; virtual networks, including virtual private networks; virtual applications and operating systems; and virtual clients.

In one example, management layer 1240 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

In the above-described cloud computing environment, the present invention might involve several of these layers if implemented in a cloud computing environment. But, the underlying concept of the present invention, as moving memory between applications, would show up in the "virtualization layer", since the present invention is directed to a form of "memory virtualization", thus making memory "virtual" (not to be confused with "virtual memory" in the traditional sense).

However, as would also be clear to one of ordinary skill in the art, the present invention could also be implemented in environments other than the cloud computing environment, since any machine executing an $ARE_i$ could potentially utilize the mechanisms described in the present invention.

While the invention has been described in terms of a single preferred embodiment, those skilled in the art will recognize that the invention can be practiced with modification within the spirit and scope of the appended claims. As previously noted, the present invention provides a new mechanism for dynamic memory allocation for any application runtime environment that has an interface to report internal parameter values, including environments in both virtual and non-virtual environments.

Further, it is noted that, Applicants' intent is to encompass equivalents of all claim elements, even if amended later during prosecution.

Having thus described our invention, what we claim as new and desire to secure by Letters Patent is as follows:

1. a method, comprising:
   receiving, by a processor on a computer, through an interface of an application runtime environment (ARE), a first set of internal operational metrics of said ARE executing at a current setting S1;
   determining, by said processor, a first performance P1 of said ARE at the current setting S1 using said received first set of internal operation metrics;
   varying, by said processor, the current setting S1 of said ARE to a new setting S2;
   receiving, by said processor, through the interface of the ARE, a second set of internal operational metrics of said ARE executing at the new setting S2;
   determining, by said processor, a second performance P2 of said ARE at said new setting S2 using said received second set of internal operation metrics; and
   re-allocating, by said processor, a memory allocation for said ARE based on the determined performances P1 and P2,
   wherein said ARE comprises one of a plurality of collocated AREs and said re-allocating memory allocation comprises determining a fair share of a total amount of memory available for all of said plurality of collocated AREs, such that said total amount of available memory is globally optimized over said plurality of collocated AREs,
   wherein a fair share re-allocation of memory comprises changing a setting of one or more of said collocated AREs so that all said collocated AREs have a same relative performance slope S,
   wherein determining a performance slope S comprises calculating a normalized performance P of said ARE by calculating a performance slope of said ARE at said two setting values S1 and S2,
   wherein said setting of said ARE comprises setting a value for a largest size of physical memory that can be allocated to said ARE,
   wherein said ARE comprises a virtual machine (VM), wherein the VM comprises a Java virtual machine (JVM), wherein said interface comprises a Java Management Extension (JMX) interface that selectively provides information on operational aspects of said JVM, including aspects of a memory status of the JVM, wherein said set of internal operational metrics comprise operational metric values for inuse-heap and for mem-freed of said JVM, at two different times $t_1$ and $t_2$ at a current setting S,
where inuse-heap indicates a current amount of a heap memory containing objects with live references in said JVM and mem-freed indicates a cumulative number of bytes collected by a garbage collection in said JVM since a startup of said JVM,
wherein said performance P is determined as an allocation rate calculated as:

alloc-rate=[inuse-heap($t_2$)−inuse-heap($t_1$)+mem-freed($t_2$)−mem-freed($t_1$)]/[($t_2$−$t_1$)];

wherein said setting comprises a largest size that a heap of the JVM can reach,
wherein said JVM comprises one of a plurality of collocated JVMs, said method further comprising:
determining a fair share for each said collocated JVM of a current total available memory for said plurality of JVMs; and
re-allocating memory allocation between said collocated JVMs to achieve said fair share by adjusting a setting as appropriate for each said JVM,
wherein said determining a fair share further comprises achieving a global optimum for allocating said total available memory among said plurality of collocated JVMs, meaning that a total memory $MEM_{tot}$ available for possible allocation to said plurality of collocated JVMs ($\Sigma_i JVM_i$) is used for said memory re-allocating, such that:

$$MEM_{tot} = \sum_i MEM_i\Big),$$

where $MEM_i$ is memory allocated to $JVM_i$, and
each $JVM_i$ has a setting that provides a relative performance slope $S_i$ that is substantially the same for all said collocated JVMs, where said relative performance slope $S_i$ for a $JVM_i$, is calculated:

$$S_i = \frac{\Delta P_i}{\Delta MaxHeapSize_i} * \frac{1}{P_i},$$

where $\Delta P_i$ is a differential performance calculated at two different settings for said $JVM_i$,
$\Delta MaxHeapSize_i$ is a differential in values of a MaxHeapSize parameter of said $JVM_i$ for said two different settings, and $P_i$ is a performance of said $JVM_i$ as calculated at a current setting.

2. The method of claim 1, wherein said fair share re-allocation of memory comprises changing a setting of one or more of said collocated JVMs so that all said collocated JVMs have a same relative performance slope S,
wherein a performance slope S is calculated as a normalized performance P of the JVM by calculating a performance slope of the VM at the two setting values S1 and S2, and
wherein said setting comprises a largest size that a heap of the JVM can reach.

3. The method of claim 1, as embodied in a set of computer-readable instructions tangibly embodied in a non-transitory storage medium.

4. A method, comprising:
measuring continuously, using a processor on a computer, a performance $P_i$ of each application runtime environment $ARE_i$ of a plurality of AREs currently executing in a system at current settings $S_i$;
each said $ARE_i$ comprising a process being executed on a computer in said system and having an interface for selectively reporting current values of a set of internal operational metrics;
varying, by said processor, the settings $S_i$, respectively, for each $ARE_i$, an amount above or below a target setting $T_i$ for each $ARE_i$, to calculate the performance $P_i$ at the varied setting $S_i$, for each $ARE_i$
re-allocating, by said processor, memory to said AREs, as based on said performance calculations; and
calculating a relative performance slope $$R_i = \frac{\Delta P_i}{\Delta S_i} * \frac{1}{P_i}$$

for each $ARE_i$, where $\Delta S_i$ is a difference in setting values and $\Delta P_i$ is a difference in performance for the different setting values;
using said calculated relative performance slopes as a basis for said re-allocating memory to said AREs;
wherein said memory re-allocating is achieved by varying said settings of said AREs until said relative performance slopes are substantially equal for all said AREs.

5. The method of claim 4, as embodied in a set of computer-readable instructions tangibly embodied in a non-transitory storage medium.

6. The method of claim 4, wherein said AREs comprise Java virtual machines (JVMs).

7. A method, comprising:
measuring continuously, by a processor on a computer, a performance $P_i$ of each application runtime environment $ARE_i$, of a plurality of AREs currently executing in a system at current settings $S_i$,
each said $ARE_i$, comprising a process being executed on a computer in said system and having an interface for selectively reporting current values of a set of internal operational metrics; and
allocating, by said processor, an amount of memory for each $ARE_i$, as based on adjusting settings $S_i$, of said AREs, so that a relative performance slope $R_i$ for each $ARE_i$ is substantially equal,
wherein said AREs comprise Java virtual machines (JVMs) and said performance $P_i$ is determined as an allocation rate calculated as:

alloc-rate=[inuse-heap($t_2$)−inuse-heap($t_1$)+mem-freed($t_2$)−mem-freed($t_1$)]/[($t_2$−$t_1$)];

where inuse-heap indicates a current amount of a heap memory containing objects with live references in a $JVM_i$ and mem-freed indicates a cumulative number of bytes collected by a garbage collection in said $JVM_i$ since a startup of said $JVM_i$;
wherein said relative performance slope $R_i$ of each $JVM_i$ is determined by varying a setting $S_i$ respectively for each $JVM_i$, an amount above or below a target setting $T_i$ for each $JVM_i$ to calculate the performance $P_i$ at the varied setting $S_i$ for each $JVM_i$; and wherein the performance $R_i$ is calculated:

$$R_i = \frac{\Delta P_i}{\Delta S_i} * \frac{1}{P_i},$$

where $\Delta S_i$ is a difference in setting values and $\Delta P_i$ is a difference in performance for the different setting values.

* * * * *